(12) United States Patent
Choi

(10) Patent No.: US 7,520,604 B2
(45) Date of Patent: Apr. 21, 2009

(54) MULTI-PURPOSE EYEGLASSES

(75) Inventor: Woon-Taek Choi, Masan (KR)

(73) Assignee: KBC America, Inc., Burbank, CA (US)

( * ) Notice: Subject to any disclaimer, the term of this patent is extended or adjusted under 35 U.S.C. 154(b) by 0 days.

(21) Appl. No.: 11/573,812

(22) PCT Filed: Oct. 21, 2004

(86) PCT No.: PCT/US2004/034627

§ 371 (c)(1),
(2), (4) Date: Feb. 16, 2007

(87) PCT Pub. No.: WO2006/022766

PCT Pub. Date: Mar. 2, 2006

(65) Prior Publication Data

US 2007/0273824 A1 Nov. 29, 2007

(30) Foreign Application Priority Data

Aug. 16, 2004 (KR) .................. 20-2004-0023361 U

(51) Int. Cl.
*G02C 7/08* (2006.01)
(52) U.S. Cl. .......................................... 351/57; 351/47
(58) Field of Classification Search .................... 351/41, 351/44, 47, 48, 57, 58
See application file for complete search history.

(56) References Cited

U.S. PATENT DOCUMENTS

| | | | |
|---|---|---|---|
| 1,754,694 A | 4/1930 | Neuwirth | |
| 1,846,679 A | 2/1932 | Fischer | |
| 1,936,746 A | 11/1933 | Baker | |
| 2,387,821 A | 10/1945 | Baratelli et al. | |
| 4,785,481 A | 11/1988 | Palmer, III et al. | |
| 4,796,986 A * | 1/1989 | Gowdy, Jr. ................... | 351/57 |
| 4,934,807 A | 6/1990 | Bolle et al. | |
| 5,191,364 A | 3/1993 | Kopfer | |
| D339,596 S | 9/1993 | Kopfer | |
| 5,300,963 A | 4/1994 | Tanaka | |
| 5,388,269 A | 2/1995 | Griffin | |
| 5,428,411 A | 6/1995 | Kopfer | |

(Continued)

FOREIGN PATENT DOCUMENTS

FR 321.010 7/1902

(Continued)

*Primary Examiner*—Huy K Mai
(74) *Attorney, Agent, or Firm*—Miles & Stockbridge P.C.; David R. Schaffer, Esq.

(57) ABSTRACT

A pair of multi-purpose eyeglasses has a main frame and an inner frame. The main frame includes a lens holder for holding lenses, a pair of temple arms hingedly assembled with opposite side edges of the lens holder, and side assembling ribs protruding from the side edges of the lens holder. The temple arms extends backward from and being capable of pivoting around the opposite side edges of the lens holder, and each of the side assembling ribs has a side assembling groove formed between the side assembling rib and the lens holder. The inner frame is detachably assembled with the outer frame and has side edges each of which can be inserted in the side assembling groove. A sealing member is attached to an inner surface of the inner frame. The inner frame and the outer frame can be easily assembled with or disassembled from each other according to a user's intention.

10 Claims, 6 Drawing Sheets

U.S. PATENT DOCUMENTS

| | | | |
|---|---|---|---|
| 5,495,303 | A | 2/1996 | Kolentsi |
| 5,548,351 | A | 8/1996 | Hirschman et al. |
| 5,583,583 | A | 12/1996 | Wilson |
| 5,614,963 | A | 3/1997 | Parker |
| 5,657,106 | A | 8/1997 | Herald, Jr. et al. |
| 5,796,461 | A | 8/1998 | Stepan |
| D398,021 | S | 9/1998 | Bolle |
| 5,802,622 | A | 9/1998 | Bahaarad et al. |
| 5,898,468 | A | 4/1999 | Mage |
| 6,050,684 | A | 4/2000 | Mage |
| 6,062,688 | A | 5/2000 | Vinas |
| 6,065,834 | A | 5/2000 | Willhite |
| 6,076,196 | A | 6/2000 | Masumoto |
| D428,913 | S | 8/2000 | Kopfer |
| D429,754 | S | 8/2000 | Markovitz |
| 6,224,209 | B1 | 5/2001 | Chen |
| 6,233,342 | B1 | 5/2001 | Fernandez |
| 6,282,727 | B1 | 9/2001 | Lindahl |
| 6,491,388 | B1 | 12/2002 | Chen |
| 6,550,914 | B1 | 4/2003 | Kopfer |
| D474,224 | S | 5/2003 | Chen |
| 6,641,263 | B2 | 11/2003 | Olney |
| D484,526 | S | 12/2003 | Teng |
| 6,749,299 | B1 | 6/2004 | Hsu |
| D495,356 | S | 8/2004 | Freeman |
| 6,793,336 | B2 | 9/2004 | Min |
| 6,817,709 | B2 | 11/2004 | Min |
| 6,926,403 | B2 | 8/2005 | Yi et al. |
| 6,938,277 | B2 | 9/2005 | Lindahl |
| 7,091,634 | B2 | 8/2006 | Yi et al. |

FOREIGN PATENT DOCUMENTS

| | | |
|---|---|---|
| FR | 324.973 | 10/1902 |
| KR | 20-0246380 | 8/2001 |
| KR | 20-0315941 | 5/2003 |

\* cited by examiner

-- PRIOR ART --

MULTI-PURPOSE EYEGLASSES

BACKGROUND OF THE INVENTION

1. Field of the Invention

The present invention relates to a pair of multi-purpose eyeglasses and more particularly to a pair of eyeglasses including an outer frame and an inner frame which can be easily assembled with and disassembled from each other.

2. Description of the Prior Art

In general, eyeglasses are used for compensating for poor eyesight or preventing a wearer's eyes from being dazzled by strong light beams. According to their utility, eyeglasses may be classified into various types of eyeglasses, including conventional eyeglasses, sunglasses, etc.

Worldwide, more attention is paid to health and people engaging in sports are increasing. Especially, people often ride bicycles or motorcycles and engages in activities at some risk in order to enjoy speed. In this case, riders of such vehicles put on various protective gear such as helmets for protecting heads, protective eyewear for protecting eyes, arm protectors, kneels protectors, gloves, etc. Above all, the protective eyewear is required to have a capability of preventing sunlight, wind or alien material from coming into eyes of a rider of a high-speed vehicle such as a bicycle or a motorcycle, thereby protecting the eyes of the rider.

Korean Utility Model registration No. 20-0246380 discloses a pair of multi-purpose eyeglasses having an inner frame which is detachably assembled with a main frame (outer frame) and prevents wind or various alien materials from coming into the inside of the eyeglasses, thereby providing convenience for the wearer.

As shown in FIG. 1, the disclosed eyeglasses include an outer frame 5, an inner frame 15, and a sponge pad 13. The outer frame 5 includes lens holding rims 2 for holding lenses 3, a bridge 1 formed between the lens holding rims 2, and side protuberances 4 formed integrally with outer edge portions of the lens holding rims 2. The bridge 1 has a groove 1a formed on a rear surface of the bridge 1. The inner frame 15 has a central protuberance 12a formed on a front surface of a bridge 12 of the inner frame 15 and clamping mouths 11 formed at edge portions of a rear surface of the inner frame 15. When the outer frame 5 and the inner frame 15 are assembled with each other, the side protuberances 4 are inserted in the clamping mouths 11 and the central protuberance 12a is inserted in the groove 1a. The sponge pad 13 is attached to the rear surface of the inner frame 15.

When a user uses the disclosed multi-purpose eyeglasses for conventional purposes, a user puts on only the outer frame 5 holding lenses 3. In contrast, the user puts on the assembly of the outer frame 5, the inner frame 15 and the sponge pad 13 in order to prevent alien materials from coming into the wearer's eyes when playing high-speed sports such as bicycling or motorcycling.

In order to assemble the disclosed multi-purpose eyeglasses, a user must simultaneously insert the central protuberance 12a of the inner frame 15 into the groove 1a of the outer frame 5 and the side protuberances 4 of the outer frame 5 into the clamping mouths 11 of the inner frame 15. In this case, it is difficult and inconvenient to insert the central protuberance 12a in the groove 1a because their positions need to be exactly confirmed in advance in order to engage them with each other.

Further, in order to disassemble the inner frame 15 from the outer frame 5, a user must hold the outer frame 5 by one hand and the inner frame 15 by the other hand, and then must pull them apart from each other. In this case, it is not easy to separately hold each of the outer frame 5 and the inner frame 15 assembled with each other by hands. This inconvenience is extremely cumbersome especially for individuals having large hands.

SUMMARY OF THE INVENTION

Accordingly, the present invention has been made to solve the above-mentioned problems occurring in the prior art, and an object of the present invention is to provide a pair of multi-purpose eyeglasses including an outer frame and an inner frame which can be easily assembled with and disassembled from each other.

In order to accomplish this object, there is provided a pair of multi-purpose eyeglasses comprising: an outer frame including a lens holder for holding lenses, a pair of temple arms hingedly assembled with opposite side edges of the lens holder, and side assembling ribs protruding from the side edges of the lens holder, the temple arms extending backward from and being capable of pivoting around the opposite side edges of the lens holder, each of the side assembling ribs having a side assembling groove formed between the side assembling rib and the lens holder; and an inner frame detachably assembled with the outer frame, the inner frame having side edges each of which can be inserted in the side assembling groove, the inner frame having a sealing member attached to an inner surface of the inner frame.

Each of the side assembling ribs may have a guide surface and a stopper, the guide surface extending from a top of the side assembling rib to the side assembling groove in gradual inclination, the stopper forming a bottom of the side assembling groove.

The lens holder has a plurality of central pores and a plurality of side pores. The central pores are formed through a pair of nose supports protruding backward from central portions of the lens holder, and the side pores are formed through opposite edge portions of the lens holder outside of the lenses.

The sealing member includes a sponge portion attached to the inner surface of the inner frame and a leather portion attached to an inner surface of the sponge portion. The sealing member has a shape corresponding to the inner surface of the inner frame. That is, in order to enable the leather portion to be in close contact with a user's skin when the user puts on the multi-purpose glasses, it is preferred that the sealing member is subjected to a separate heat treatment so as to have a shape memory capability. The sealing member having a shape memory capability prevents distortion of its surface when the sealing member is attached to the inner frame, thereby enabling the user to feel pleasant when the user has put on the eyeglasses.

Each of the side assembling ribs may have an inclined surface formed in the side assembling groove or a stepped portion formed at its edges. The inner frame and the outer frame may have flexibility so that they can be elastically deformed to facilitate their assembly.

It is preferred that each of the side assembling ribs protrudes inward from at least a portion of one side edge of the lens holder in parallel to the lens holder, so that opposite side edges of the inner frame can be engaged with the side assembling ribs.

Further, a stopper extending in a transverse direction from the surface of the side assembling groove enables lower corners of the inner frame to be placed on the stopper, facilitating location of the inner frame, when the outer frame and the inner frame are assembled with each other.

Also, a central assembling rib may be formed at a front surface of a second bridge of the inner frame, so that the central assembling rib can be seated in the central assembling groove.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings.

Figure 1:
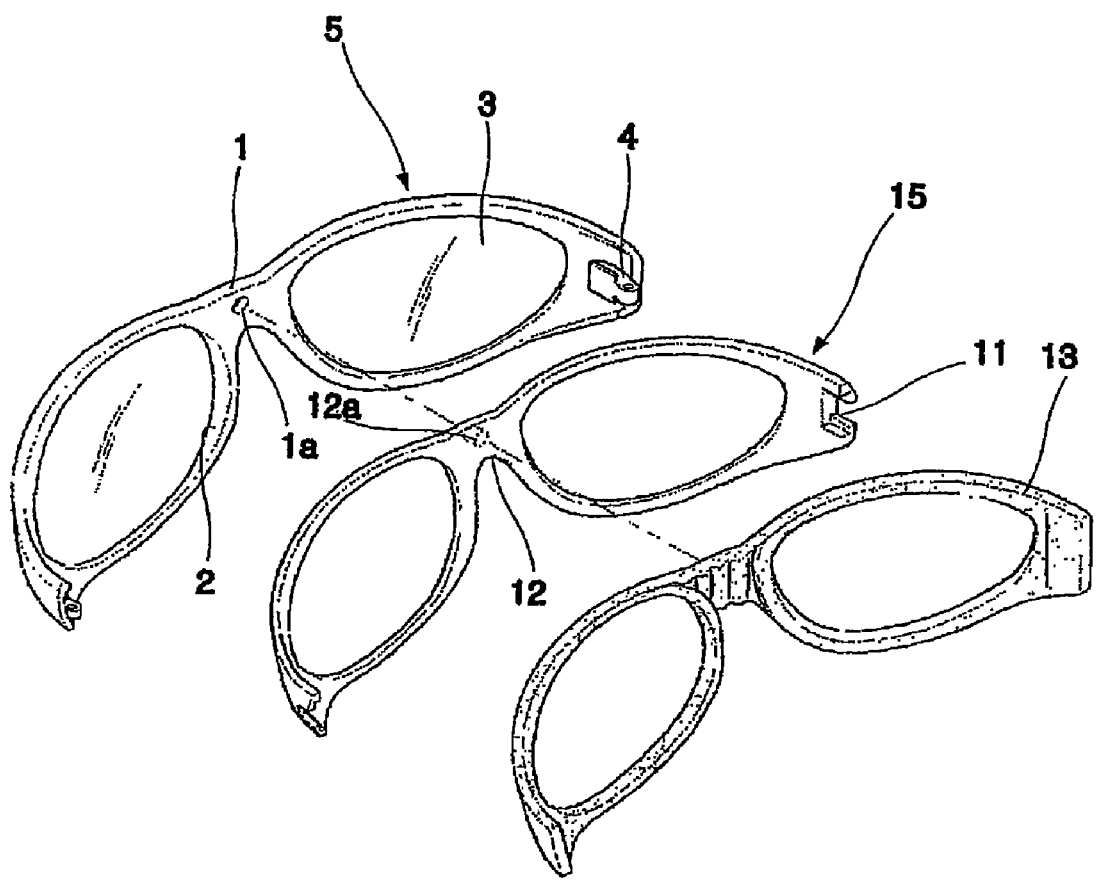
FIG. 1 is an exploded perspective view of a pair of multi-purpose eyeglasses according to the prior art.
Figure 2:
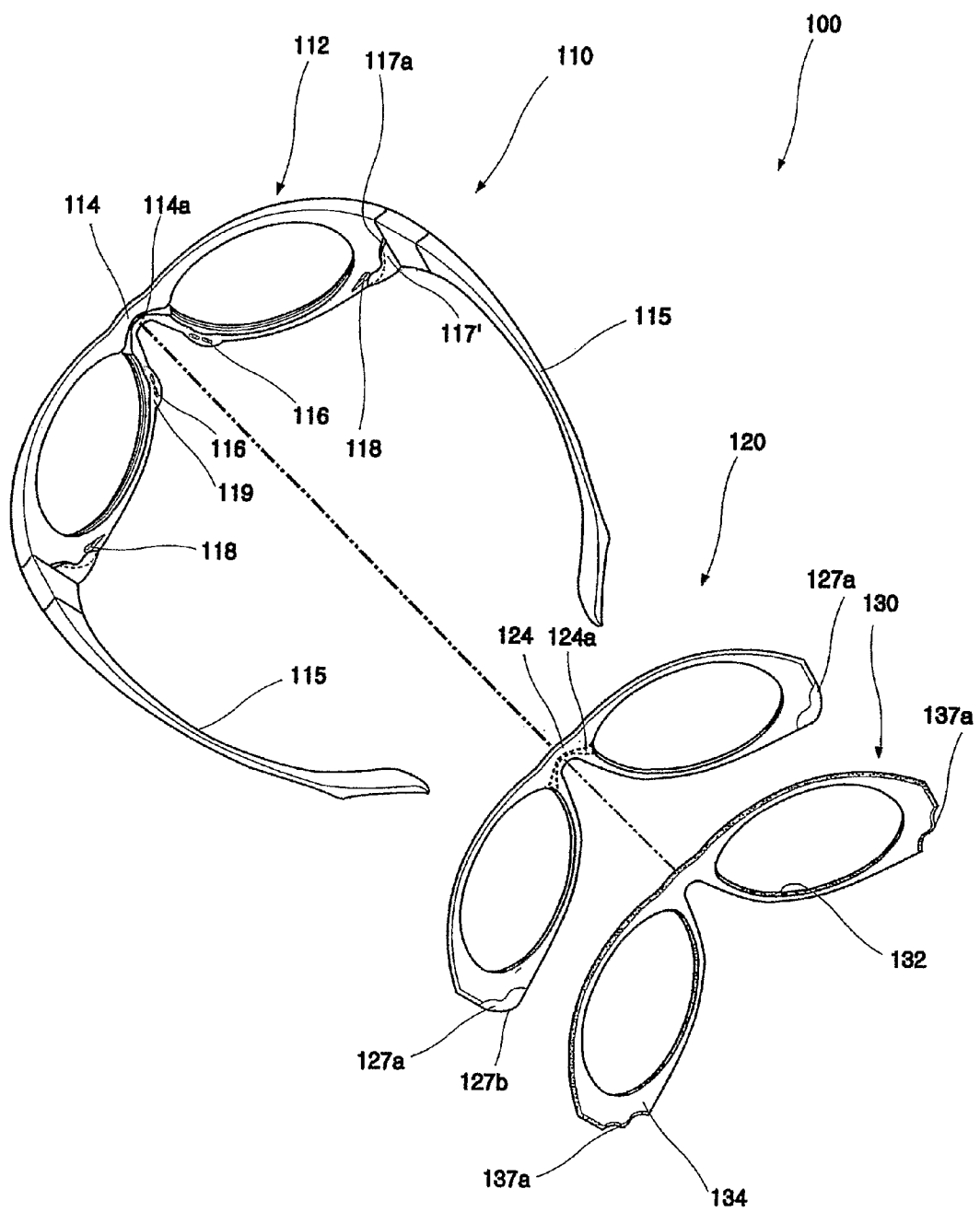
FIG. 2 is an exploded perspective view of a pair of multi-purpose eyeglasses according to an embodiment of the present invention.

FIG. 2 is an exploded perspective view of a pair of multi-purpose eyeglasses according to an embodiment of the present invention. As shown, a pair of multi-purpose eyeglasses 100 according to the present invention includes an outer frame 110 for holding lenses (not shown), an inner frame 120 detachably assembled with an inside of the outer frame 110, and a sealing member 130 attached to an inside of the inner frame 120.

The outer frame 110 includes a lens holder 112 for holding lenses and a pair of temple arms 115 hingedly assembled with opposite side edges of the lens holder 112. The temple arms 115 extend backward from and can pivot around the opposite side edges of the lens holder 112.

Figure 4:
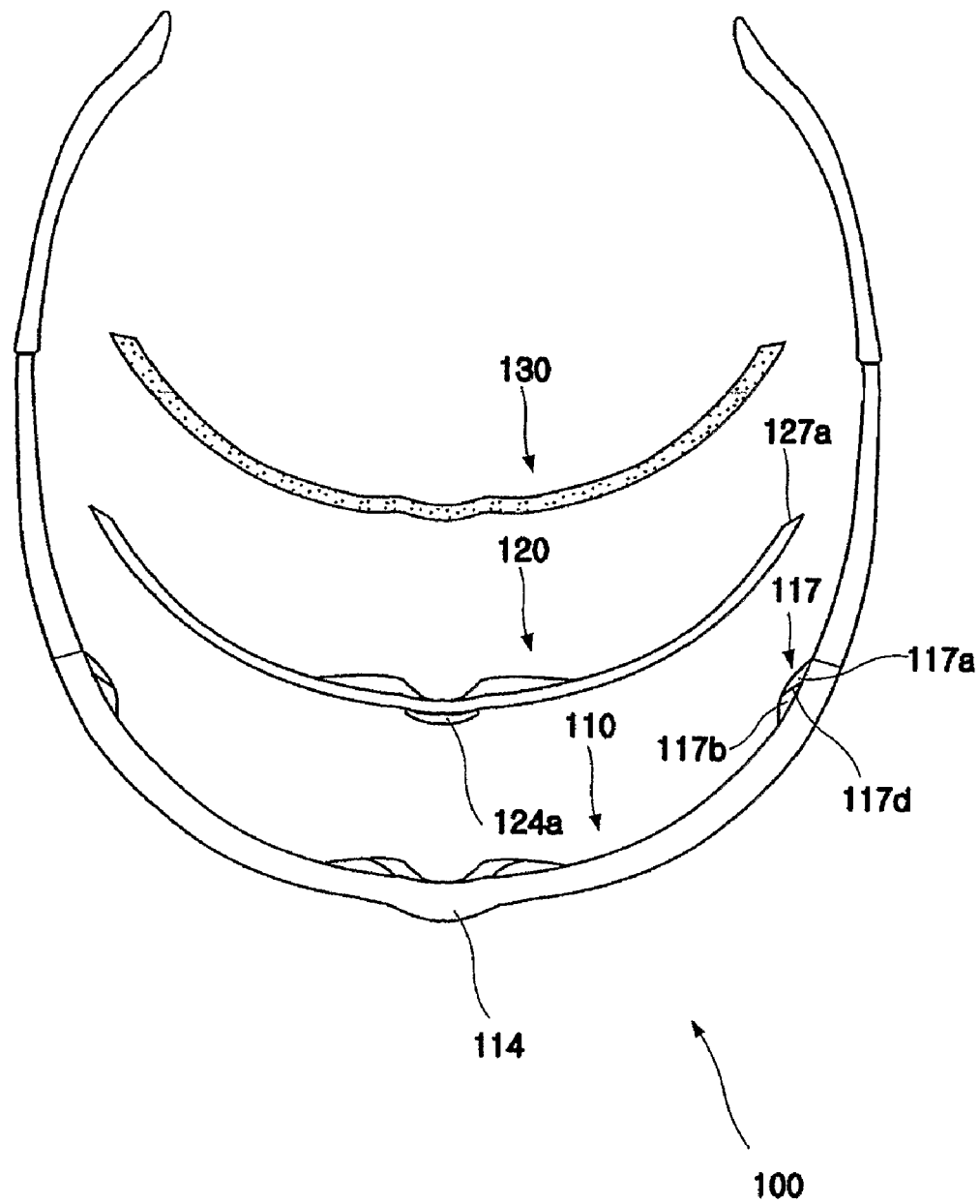
FIG. 4 is an exploded plan view of a pair of multi-purpose eyeglasses according to an embodiment of the present invention.
Figure 5:
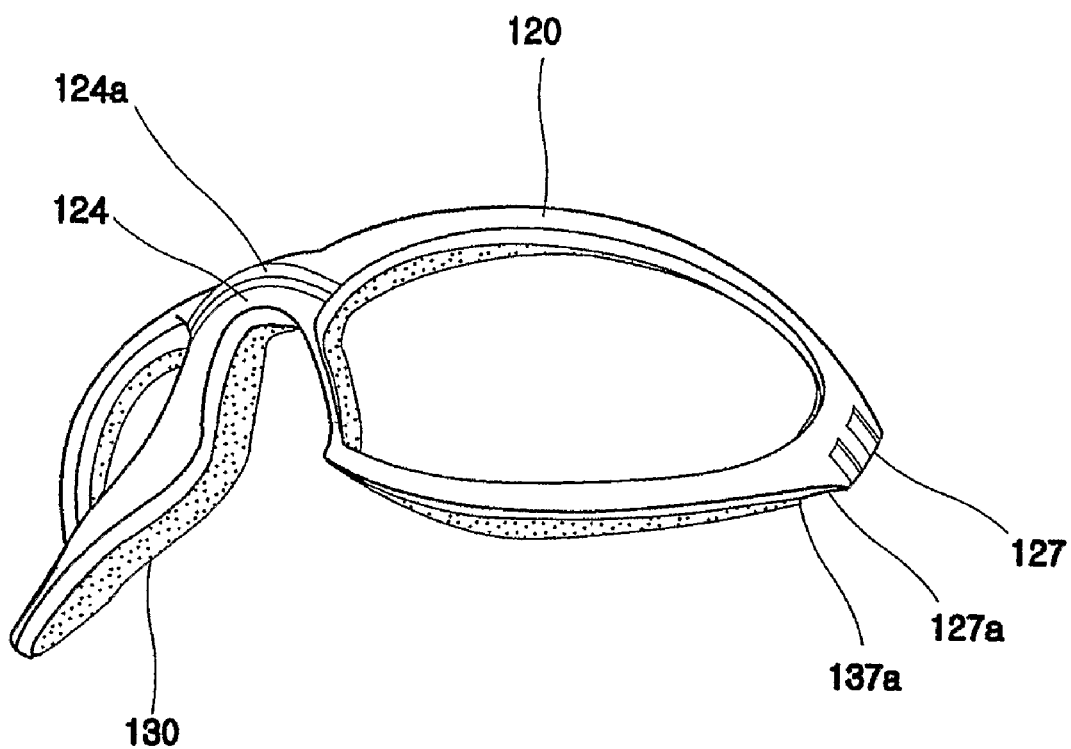
FIG. 5 is an exploded perspective view of a pair of multi-purpose eyeglasses according to another embodiment of the present invention.

Further, side assembling ribs 117 protrude inward from the side edges of the lens holder 112 of the outer frame 110 in parallel to the lens holder 112, respectively. Each of the side assembling ribs 117 has a side assembling groove 117c or 117d formed between the side assembling rib 117 and the lens holder 112. Each of the side assembling ribs may have either the side assembling groove 117d having a slant surface and narrowing in the inward direction of the assembling groove as shown in FIG. 4 or the side assembling groove 117c having a stepped portion as shown in FIG. 5.

Figure 6:
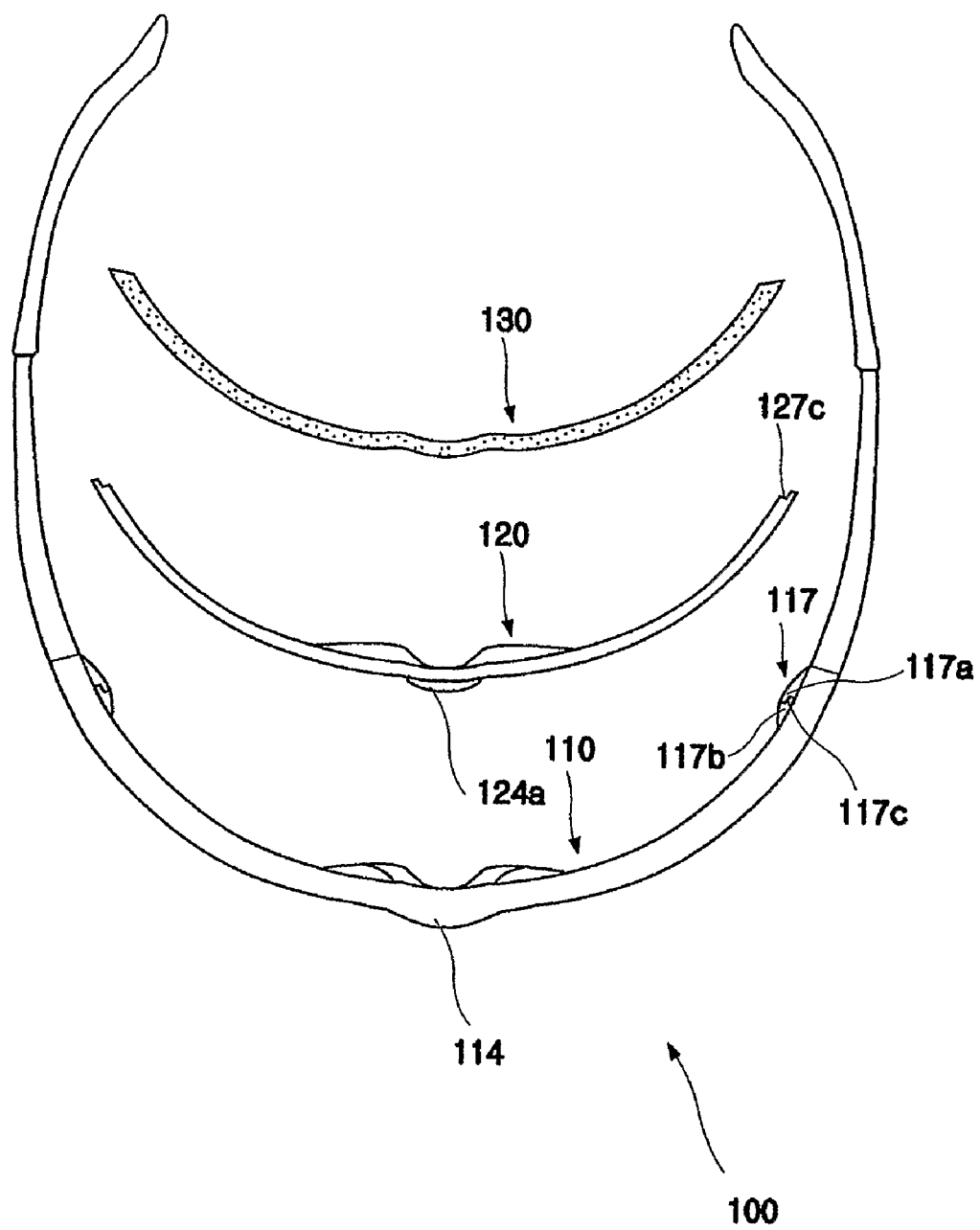
FIG. 6 is an exploded plan view of a pair of multi-purpose eyeglasses according to another embodiment of the present invention.

The side assembling ribs 117 have vertical lengths identical to vertical lengths of the side edges of the lens holder 112, respectively. Of course, as shown in FIG. 6, the side assembling ribs 117' may have vertical lengths shorter than the vertical lengths of the side edges of the lens holder 112, respectively. Also, it is preferred that opposite side edges of the inner frame 120 which are engaged with the side assembling rib 117 or 117' have shapes corresponding to the side assembling groove 117c or 117d of the side assembling rib 117 or 117'. That is, each of the opposite side edges of the inner frame 120 to be engaged with the side assembling groove 117d of the side assembling rib 117 or 117' having a slant surface preferably has an inclined surface 127a as shown in FIGS. 2 and 4, and each of the opposite side edges of the inner frame 120 to be engaged with the side assembling groove 117c having a stepped portion surface preferably has a stepped portion 127c as shown in FIG. 5.

Further, a first bridge 114 located at a central portion of the lens holder 112 has a central assembling groove 114a horizontally extending on an inner surface (rear surface) of the first bridge 114. It is preferred that the central assembling groove 114a has a shape corresponding to a central assembling rib 124a formed at a front surface of a second bridge 124 of the inner frame 120, so that the central assembling rib 124a can be seated in the central assembling groove 114a. The central assembling rib 124a may have a size slightly smaller than that of the central assembling groove 114a, so that external air can be introduced into the gap between the lenses and the face through the gap between the central assembling groove 114a and the central assembling rib 124a when the outer frame 110 and the inner frame 120 have been assembled with each other.

Meanwhile, the lens holder 112 may have a plurality of central pores 116 and a plurality of side pores 118. The central pores 116 and the side pores 118 allows the external air to be introduced through them into the gap between the outer frame 110 and the inner frame 120 including the gap between the central assembling groove 114a and the central assembling rib 124a. It is preferred that the central pores 116 and the side pores 118 are formed both sides of each lens so that the external air can be smoothly introduced into the interior space defined by the lenses (not shown). Specifically, the central pores 116 are formed through a pair of nose supports 119 protruding backward from central portions of the lens holder 112 and the side pores 118 are formed through opposite edge portions of the lens holder 112 outside of the lenses.

The inner frame 120 is detachably assembled inside of the outer frame 110 having the construction described above. Therefore, a user can wear either only the outer frame 110 or the assembled outer frame 110 and inner frame 120 according to necessity.

The outer surface (front surface) of the inner frame 120 must have the same curvature as that of the inner surface (rear surface) of the lens holder 112 of the outer frame 110. Further, each of the opposite edges of the inner frame 120 has the inclined surface 127a so that the inclined surface 127a can be in surface contact with the side assembling groove 117d of the side assembling rib 117 when the outer frame 110 and the inner frame 120 have been assembled with each other. Also, as shown in FIG. 5, each of the opposite edges of the inner frame 120 may have the stepped portion 127c so that the stepped portion 127c can be in surface contact with the side assembling groove 117c of the side assembling rib 117 when the outer frame 110 and the inner frame 120 have been assembled with each other.

Further, each side assembling rib 117 has a stopper 117b extending in a transverse direction from the surface of the side assembling groove. When the outer frame 110 and the inner frame 120 are assembled with each other, lower corners 127b of the inner frame 120 are placed on the stoppers 117b, facilitating location of the inner frame 120. That is, when the lower corner 127b of the inner frame 120 comes into contact with the stopper 117b after sliding downward along a guide surface 117a of the side assembling rib 117, the stopper 117b prevents the lower corner 127b from sliding downward anymore even when the user presses the inner frame 120 downward.

The guide surface 117a of the side assembling rib 117 extends from the top of the side assembling rib 117 to the side assembling groove 117c or 117d in gradual inclination, thereby enabling the opposite edges of the inner frame 120 to be easily assembled with or disassembled from the side assembling rib 117.

Further, the central assembling rib 124a protrudes from the front surface of the second bridge 124 of the inner frame 120 and extends in the horizontal direction. The central assembling rib 124a is formed at a position corresponding to the central assembling groove 114a of the outer frame 110. It is preferred that the central assembling rib 124a has a curved surface, so that the inner frame 120 can be easily guided to its destined position even when the inner frame 120 is assembled with the outer frame 110 in any direction. For example, when the inner frame 120 is either slid downward or elastically pressed inward of the outer frame 110 with a snap, the central assembling rib 124a is guided by and located in the central assembling groove 114a, so that the inner frame 120 can be easily in place inside of the outer frame 110. Especially, when the inner frame 120 is assembled with the outer frame 110 by being slid downward, the gradually inclined central assembling rib 124a can be easily seated in the central assembling groove 114a, so that the inner frame 120 can be easily and conveniently assembled with the outer frame 110.

Figure 3:
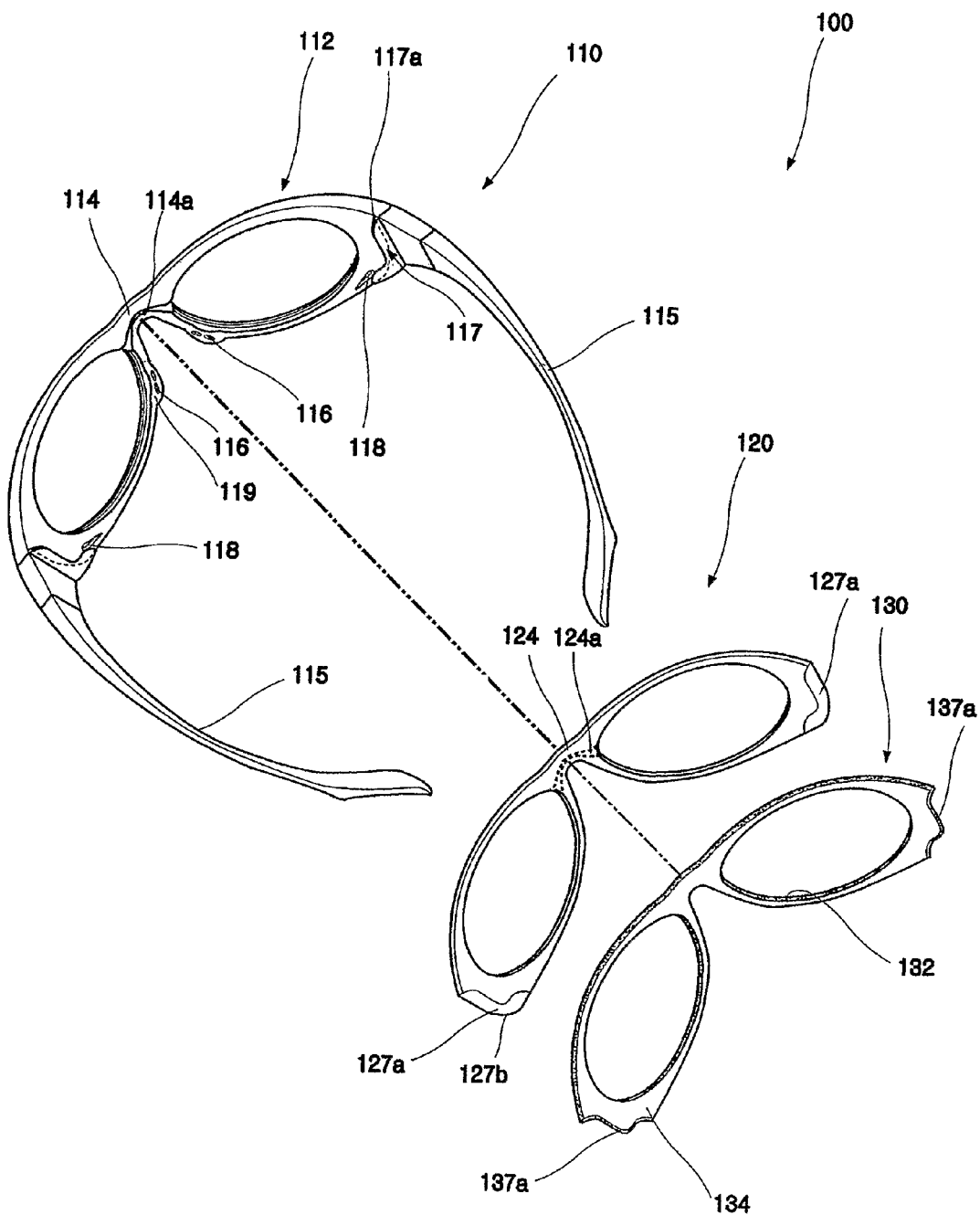
FIG. 3 is a perspective view of an inner frame employed in a pair of multi-purpose eyeglasses according to an embodiment of the present invention.

As shown in FIG. 3, the sealing member 130 is attached to an inner surface of the inner frame 120. The sealing member 130 has opposite ends 137a which do not cover the inclined surfaces 127a of the inner frame 120. Of course, in the case of the inner frame 120 shown in FIG. 5, the opposite ends 137a of the sealing member 130 do not the stepped portion 127c of the inner frame 120. Therefore, the sealing member 130 does not interfere with the side assembling rib 117 when the inner frame 120 is inserted in or drawn out of the side assembling rib 117 of the outer frame 110.

The sealing member 130 is made of porous sponge having a high elasticity and includes a sponge portion 132 attached to an inner surface of the inner frame 120 and a leather portion 134 attached to a surface of the sponge portion 132. The leather portion 134 is in contact with a user's skin when the user puts on the multi-purpose glasses. In order to enable the leather portion 134 to be in close contact with a user's skin when the user puts on the multi-purpose glasses, it is preferred that the sealing member 130 is subjected to a separate heat treatment so as to have a shape memory capability. The sealing member 130 having a shape memory capability prevents distortion of its surface when the sealing member 130 is attached to the inner frame 120, thereby enabling the user to feel pleasant when the user has put on the eyeglasses.

Especially, the leather portion 134 is a portion which comes into direct contact with the user's face when the user puts on the eyeglasses. The leather portion 134 is intended for preventing abrasion of the sponge portion 132 and enhancing contact between the eyeglasses and the user's face. Further the leather portion 134 prevents waste materials produced on the user's face, such as sweat, sebum, etc., from coming into the sponge portion 132 made of porous sponge.

When the multi-purpose eyeglasses 100 having the above-mentioned construction according to the present invention is assembled, side edges of the inner frame 120 are inserted in the side assembling grooves 117c or 117d of the side assembling ribs 117 of the outer frame 110 from above and are then slid downward along the guide surfaces 117a of the side assembling ribs 117 of the side assembling ribs 117. When the lower corners 127b comes into contact with the stoppers 117b of the side assembling ribs 117, the outer frame 110 and the inner frame 120 are completely assembled with each other. Then, the central assembling groove 114a is seated in the central assembling rib 124a, so that the first bridge 114 of the outer frame 110 and the second bridge 124 of the inner frame 120 are aligned with each other.

When the multi-purpose eyeglasses 100 assembled as described above is disassembled, the inner frame 120 is pushed upward, so that the side edges of the inner frame 120 are slid upward along the guide surfaces 117a of the side assembling ribs 117. When the side edges of the inner frame 120 have escaped out of the side assembling grooves 117c or the side assembling grooves 117d, the outer frame 110 and the inner frame 120 are completely separated from each other. In this case of the side assembling rib 117 having the guide surface 117a, the upper portion of the side assembling groove 117c or 117d is wider than the lower portion of the side assembling groove 117c or 117d, so that the inner frame 120 can be separated out of the upper portion with clearance in the side assembling groove 117c or 117d.

As shown in FIG. 2, when the side assembling rib 117 has a relatively long side wall, the outer frame 110 and the inner frame 120 can be assembled with each other with an enhanced power but can be separated from each other only after sliding a longer distance. In contrast, when the side assembling rib 117' has a relatively short side wall as shown in FIG. 6, the outer frame 110 and the inner frame 120 can be more easily assembled with or disassembled from each other after sliding a reduced distance. Therefore, each of the side assembling ribs 117 or the side assembling ribs 117' may have various lengths according to necessities. In other words, the side wall of each side assembling rib 117 may have a length as short as possible on condition that the side wall should enable the outer frame 110 and the inner frame 120 to be assembled with or disassembled from each other.

Also, according to the present invention, the inner frame 120 to which the sealing member 130 has been attached can be assembled with the outer frame 110 by pressing them together with a snap by the fingers. In this case, the outer frame 110 and the inner frame 120 are instantly deformed by elasticity when the inclined surfaces 127a of the side edges of the inner frame 120 are inserted in the side assembling ribs 117 or 117'.

In order to separate the outer frame 110 and the inner frame 120 from each other, the side edges of the lens holder 112 and the temple arms 115 may be held by the hands and are then widened. Then, the curved lens holder 112 is flexibly bent outward and the side assembling ribs 117 become away from each other, and the inclined surfaces 127a of the inner frame 120 are then disengaged from the side assembling ribs 117 and escape from the side assembling grooves 117c or 117d. Then, the inner frame 120 is completely separated from the outer frame 110. Thereafter, the side edges of the lens holder 112 and the temple arms 115 are released from the hands, so that the outer frame 110 restores its original shape by its elasticity.

In the multi-purpose eyeglasses according to the present invention as described above, the inner frame 120 to which the sealing member 130 is attached can be easily assembled with or disassembled from the outer frame 110 by sliding the inner frame 120 into the side assembling grooves 117c or 117d of the side assembling ribs 117 or 117'. Further, the inner space inside of the lenses can be ventilated with external air through the central pores 116, the side pores 118, and the central assembling groove 114a.

As described above, the present invention enables typical glasses for eyesight compensation or sunglasses to be easily assembled with or disassembled from each other. In other words, the present invention provides a pair of multi-purpose eyeglasses which can be used on various purposes.

Further, in the multi-purpose eyeglasses according to the present invention as described above, the inner frame can be easily assembled with or disassembled from the outer frame by sliding the inner frame into the side assembling grooves of the side assembling ribs. Especially, the guide surface formed inside of the side assembling rib facilitates sliding the opposite edges of the inner frame, thereby enabling the inner frame to be easily assembled with or disassembled from the side assembling rib. Also, the upper portion of the side assembling groove wider than the lower portion thereof enables the inner frame to easily escape from the side assembling rib.

Moreover, the central assembling rib formed at the inner frame is guided by and located in the central assembling groove, so that the inner frame can be easily in place inside of the outer frame.

Furthermore, a user can easily assemble or disassemble a pair of multi-purpose eyeglasses according to the present invention by means of the elasticity of the outer frame and the inner frame. That is, the user can assemble the inner frame and the outer frame with each other by snapping them on each other and can disassemble the inner frame and the outer frame from each other by simply widening the outer frame. The widened outer frame restores its original shape by its elasticity when the force applied to the outer frame is released.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A pair of multi-purpose eyeglasses comprising:
an outer frame including a lens holder for holding lenses, a pair of temple arms hingedly assembled with opposite side edges of the lens holder, and side assembling ribs protruding from the side edges of the lens holder, the temple arms extending backward from and being capable of pivoting around the opposite side edges of the lens holder, each of the side assembling ribs having a side assembling groove formed between the side assembling rib and the lens holder; and
an inner frame detachably assembled with the outer frame, the inner frame having side edges each of which can be inserted in the side assembling groove, the inner frame having a sealing member attached to an inner surface of the inner frame.

2. A pair of multi-purpose eyeglasses as claimed in claim 1, wherein each of the side assembling ribs protrudes inward from at least a portion of one side edge of the lens holder in parallel to the lens holder.

3. A pair of multi-purpose eyeglasses as claimed in claim 2, wherein each of the side assembling ribs has a guide surface and a stopper, the guide surface extending from a top of the side assembling rib to the side assembling groove in gradual inclination, the stopper forming a bottom of the side assembling groove.

4. A pair of multi-purpose eyeglasses as claimed in claim 3, wherein each of the side assembling ribs has an inclined surface formed in the side assembling groove.

5. A pair of multi-purpose eyeglasses as claimed in claim 3, wherein each of the side assembling ribs has a stepped portion formed at its edges.

6. A pair of multi-purpose eyeglasses as claimed in claim 1, wherein the lens holder has a first bridge located at a central portion of the lens holder and the inner frame has a second bridge located at a central portion of the inner frame, the first bridge having a central assembling groove horizontally extending on an inner surface of the first bridge, the second bridge having a central assembling rib formed at a front surface of the second bridge, the central assembling groove and the central assembling rib having corresponding shapes so that the central assembling rib can be seated in the central assembling groove.

7. A pair of multi-purpose eyeglasses as claimed in claim 6, wherein the central assembling rib has a size slightly smaller than that of the central assembling groove, so that external air can be introduced into a gap between the central assembling groove and the central assembling rib when the outer frame and the inner frame have been assembled with each other.

8. A pair of multi-purpose eyeglasses as claimed in claim 1, wherein the lens holder has a plurality of central pores and a plurality of side pores, the central pores being formed through a pair of nose supports protruding backward from central portions of the lens holder, the side pores being formed through opposite edge portions of the lens holder outside of the lenses.

9. A pair of multi-purpose eyeglasses as claimed in claim 1, wherein the sealing member includes:
a sponge portion attached to the inner surface of the inner frame; and
a leather portion attached to an inner surface of the sponge portion,
wherein the sealing member has a shape corresponding to the inner surface of the inner frame.

10. A pair of multi-purpose eyeglasses as claimed in claim 1, wherein the outer frame and the inner frame are elastically bendable.

* * * * *